United States Patent
Yuan et al.

(10) Patent No.: US 10,114,742 B1
(45) Date of Patent: Oct. 30, 2018

(54) EFFICIENT BUFFER ALLOCATION FOR NAND WRITE-PATH SYSTEM

(71) Applicant: SK hynix Inc., Gyeonggi-do (KR)

(72) Inventors: Wei-Hao Yuan, San Jose, CA (US); Chun Hok Ho, Foster City, CA (US); Johnson Yen, Fremont, CA (US)

(73) Assignee: SK Hynix Inc., Gyeonggi-do (KR)

( * ) Notice: Subject to any disclaimer, the term of this patent is extended or adjusted under 35 U.S.C. 154(b) by 315 days.

(21) Appl. No.: 14/839,831

(22) Filed: Aug. 28, 2015

Related U.S. Application Data

(60) Provisional application No. 62/046,741, filed on Sep. 5, 2014.

(51) Int. Cl.
*G06F 12/00* (2006.01)
*G06F 12/02* (2006.01)
*G06F 12/06* (2006.01)

(52) U.S. Cl.
CPC .......... *G06F 12/0246* (2013.01); *G06F 12/06* (2013.01); *G06F 2212/2022* (2013.01); *G06F 2212/7203* (2013.01)

(58) Field of Classification Search
None
See application file for complete search history.

(56) References Cited

U.S. PATENT DOCUMENTS

| 8,341,338 | B2 | 12/2012 | Lee et al. | |
| 2009/0228662 | A1* | 9/2009 | Chang | G06F 12/0246 711/148 |
| 2011/0072199 | A1* | 3/2011 | Reiter | G06F 13/14 711/103 |
| 2015/0169228 | A1* | 6/2015 | Sivasankaran | G06F 3/0625 711/103 |

OTHER PUBLICATIONS

Xilinx, LogiCORE IP AXI4-Steam FIFO v4.0 Product Guide, Vivado Design Suite, PG080 Apr. 2, 2014.*

* cited by examiner

*Primary Examiner* — Prasith Thammavong
*Assistant Examiner* — Jason W Blust
(74) *Attorney, Agent, or Firm* — IP & T Group LLP

(57) ABSTRACT

A first write data and a second write data destined for a first solid state storage channel and a second solid state storage channel, respectively, is received. The first write data is chopped using a chopping factor in order to obtain (1) a first piece of chopped write data destined for the first solid state storage channel and (2) a second piece of chopped write data destined for the first solid state storage channel. The second write data is chopped using the chopping factor in order to obtain (1) a third piece of chopped write data destined for the second solid state storage channel and (2) a fourth piece of chopped write data destined for the second solid state storage channel.

18 Claims, 7 Drawing Sheets

EFFICIENT BUFFER ALLOCATION FOR NAND WRITE-PATH SYSTEM

CROSS REFERENCE TO OTHER APPLICATIONS

This application claims priority to U.S. Provisional Patent Application No. 62/046,741 entitled EFFICIENT BUFFER ALLOCATION FOR NAND WRITE-PATH SYSTEM filed Sep. 5, 2014 which is incorporated herein by reference for all purposes.

BACKGROUND OF THE INVENTION

Solid state storage cells, including NAND flash memories, are increasingly gaining market share in both enterprise and consumer data storage solutions. They are resilient to shock and their I/O performance is better than that of conventional hard disk drives. A NAND flash memory is divided into many blocks and each block is divided into many pages.

A controller may write to a NAND flash memory and may allocate buffers for writing. These buffers occupy area space and consume power.

BRIEF DESCRIPTION OF THE DRAWINGS

Various embodiments of the invention are disclosed in the following detailed description and the accompanying drawings.

DETAILED DESCRIPTION

Figure 1:
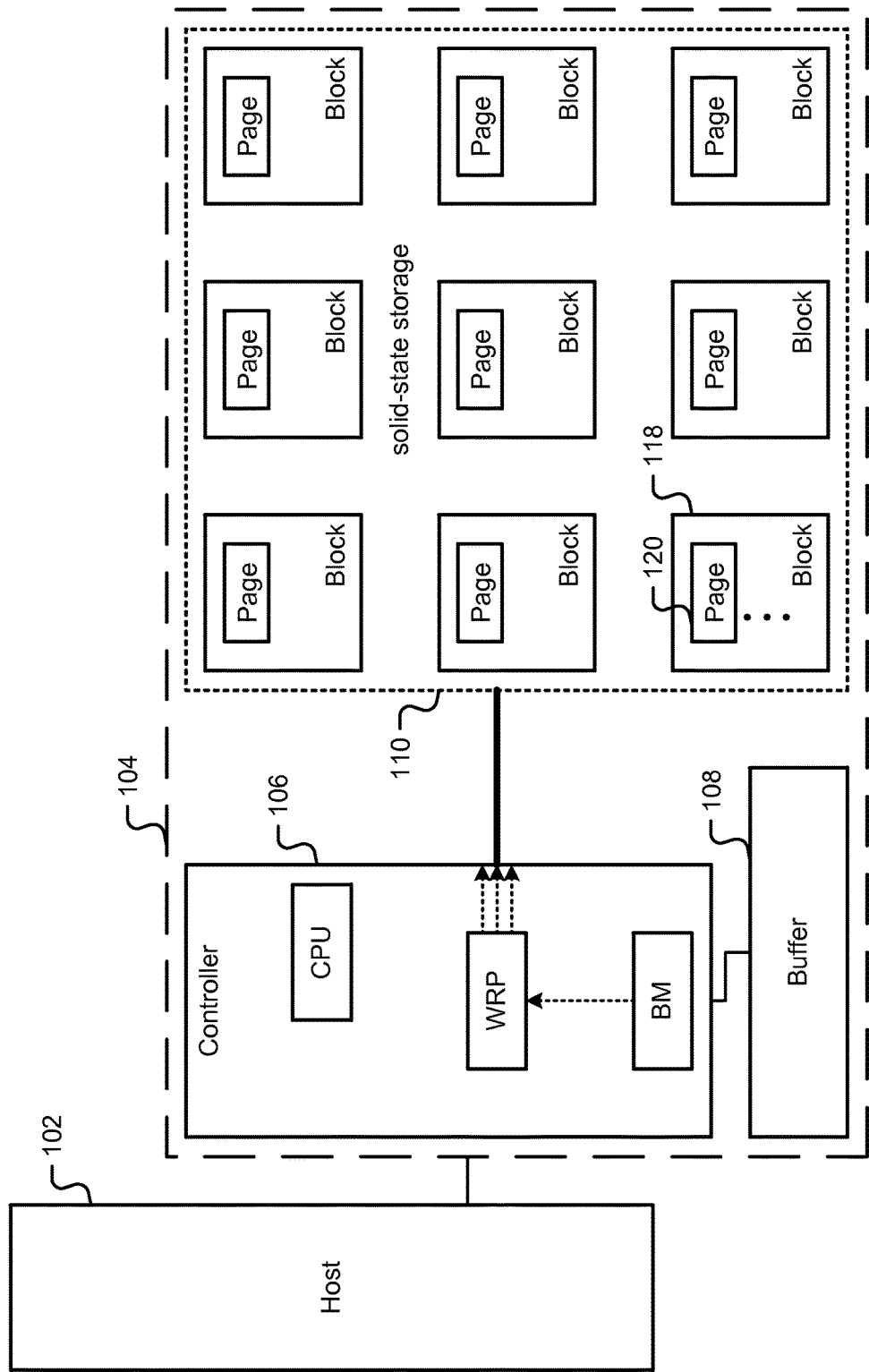
FIG. 1 is block diagram illustrating an embodiment of a system for writing to solid state storage.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A storage system is usually interfaced with one or more data transfer channels, where the system comprises multiple storage medium, such as NAND. A data stream is received from a host, and the data stream is first stored in a central memory, such as that associated with a Buffer Manager system ("BM"). The data stream is then packed as fixed-length data units, where each data unit has a predetermined length associated with the final end storage physical size. A write-path system ("WRP") is implemented to fetch data units from central memory and transfer them to the final storage medium.

Solid state storage cells, including NAND flash memories, typically have a characteristic slow interface throughput in relation to the write throughput from the host. NAND page sizes may be relatively long, for example 16 kilobytes, and thus data unit length may also be 16 kilobytes. One technique to increase overall throughput is the use of multiple data channels to write to NAND in parallel. For a multichannel system, the WRP allocates a buffer the size of a data unit for each channel. These buffers temporarily buffer data from the BM and store it to the NAND fabric via the NAND interface requirement. These buffers can end up occupying a lot of area space within the WRP and consume a large amount of power. Chopping user data with a chopping factor to reduce overall buffers in the WRP is disclosed.

FIG. 1 is block diagram illustrating an embodiment of a system for writing to solid state storage. Host 102 is coupled to solid state device 104 ("SSD"). Examples of host 102 include an enterprise server, a consumer personal computer ("PC"), a tablet, or a phone device. Examples of solid state device 104 include an SLC solid state drive, a TLC solid state drive, a solid state storage appliance, a USB flash drive, an mSATA/M.2 module, and/or an eMMC package. SSD 104 is comprised of a controller 106 coupled to a buffer 108 and a fabric of solid state storage cells 110. For example, the buffer 108 may be a DRAM buffer and the solid state storage cells 110 may be NAND cells. Examples are given without limitation and without loss of generality. NAND cells 110 may be, for example, a NAND die comprising a plurality of blocks 118, each comprising a plurality of pages 120. A page 120 comprises a plurality of local block addresses (LBAs), not shown in FIG. 1.

Controller 106 comprises a CPU 112, a BM 114, and a WRP 116. Host writes therefore may flow from host 102 through controller 106 to buffer 108. The BM 114 may then direct the data (shown as a dotted line with an arrow) to WRP 116, for writing in parallel (122) to a plurality of NAND blocks 118.

Figure 2A:
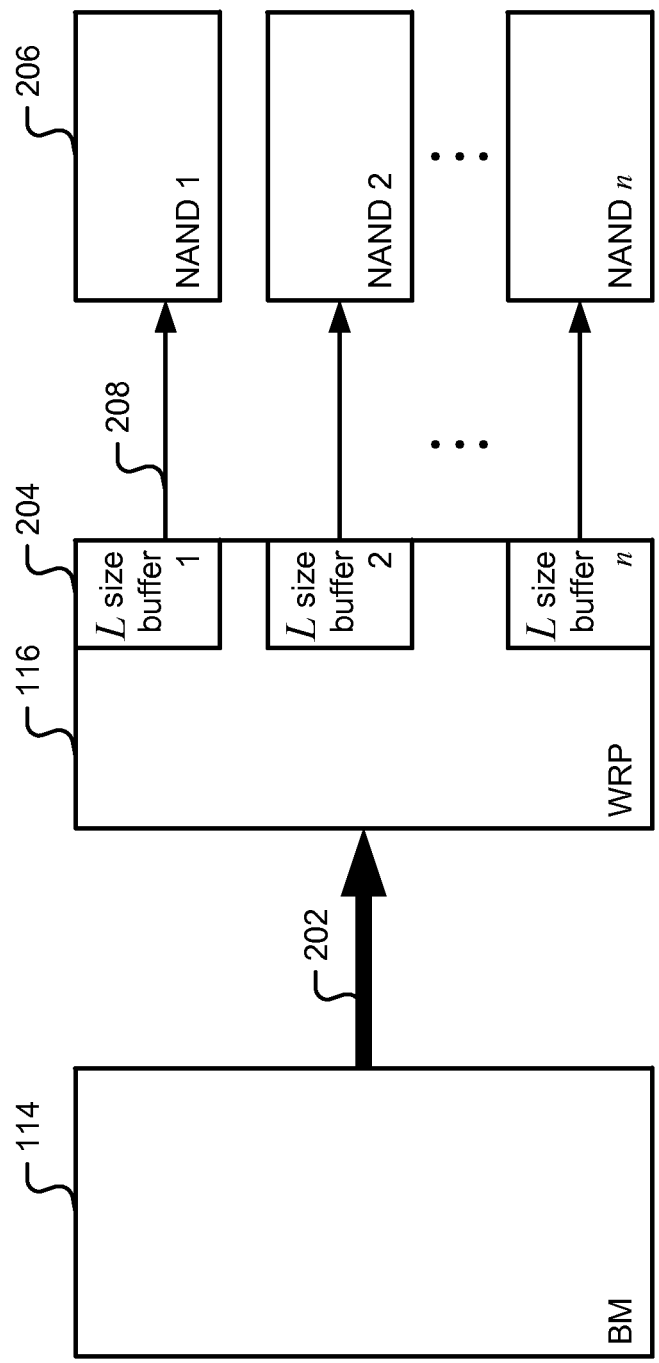
FIG. 2A is a block diagram illustrating a traditional write-path flow.

FIG. 2A is a block diagram illustrating a traditional write-path flow. BM 114 prepares data for writing to NAND by dividing arbitrary sized data into data units and transferring it via high throughput bus 202 associated with WRP 116. In many cases, for efficiency each of the data units is the size L of NAND page 120. Thus, BM 114 transfers L size data units U1, U2, ... Ut where the arbitrary sized data is approximately of length t×L.

WRP 116 receives the high throughput data and prepares it by alternately transferring and storing each data unit in a buffer 204 associated with each NAND channel 206. In the example shown in FIG. 2A, there are n channels shown. Without loss of generality, the techniques disclosed apply without limitation to dual-channel, three-channel, quad-channel systems, and any n channel systems for any positive n greater or equal to 2, e.g. n=2, 3, 4, . . . .

Without loss of generality and for the ease of presentation, the NAND blocks 206 are labeled to the corresponding buffer. In practice NAND blocks of any address are written to in any order based on vacancy and/or garbage collection. The channel buffer 204 is of size L as the throughput of each NAND channel 208 is substantively lower than that of host throughput and/or the throughput of bus 202.

Figure 2B:
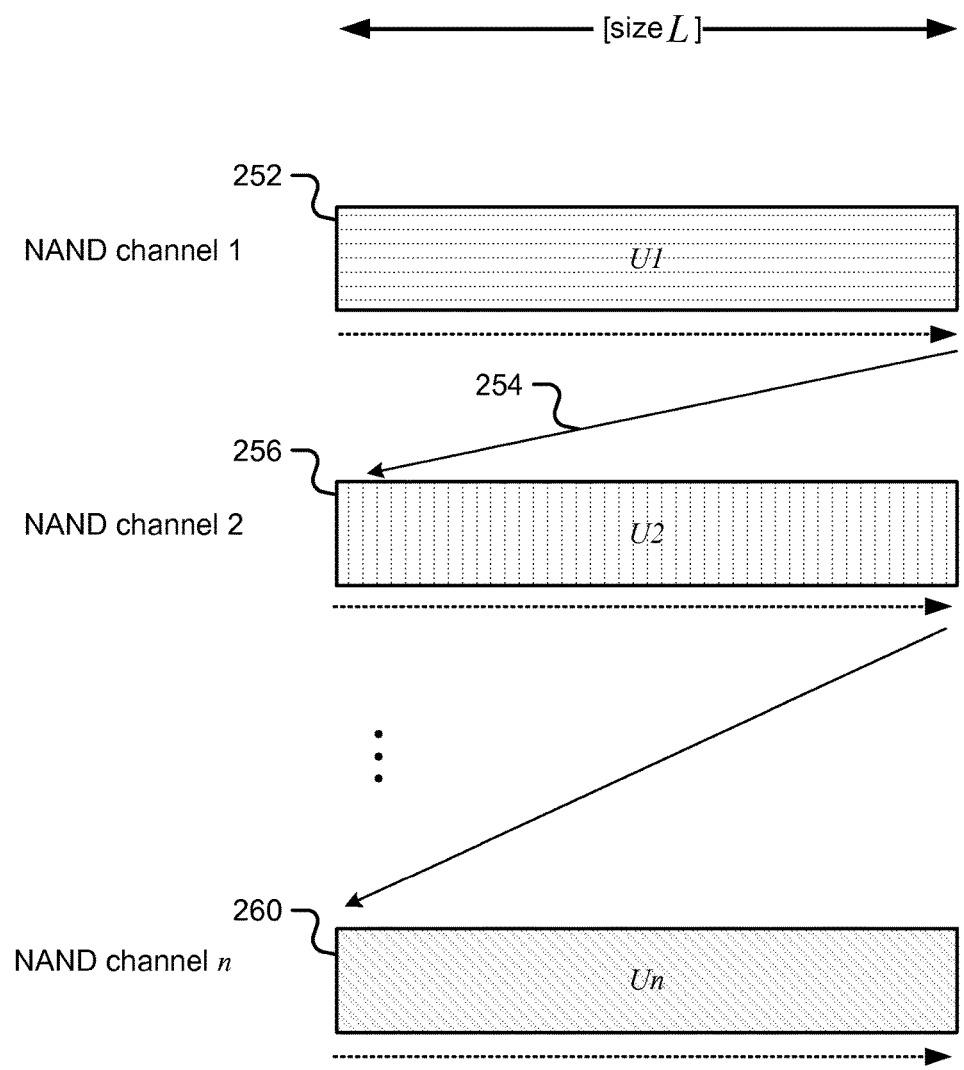
FIG. 2B is a block diagram illustrating data arbitration for a traditional write-path flow.

FIG. 2B is a block diagram illustrating data arbitration for a traditional write-path flow. This data arbitration shows the perspective of WRP 116 as it stores each data unit into a NAND channel buffer 208. Data unit U1 252 is first stored in L size buffer 1, and at the end of that storage 254, data unit U1 256 is then stored in L size buffer 1. This continues through all of the NAND channels until data unit Un 260 is stored in L size buffer n. After this the process is repeated as the next data unit Up, where p=n+1, is stored in L size buffer 1 for transfer to NAND channel 1 (or another NAND channel associated with buffer 1).

Thus, since the NAND interface throughput 208 is fixed and usually much slower than BM throughput 202, the WRP 116 needs to allocate whole corresponding buffers to guarantee data transfer.

Using less than a full-sized buffer for each channel inside WRP 116 is disclosed. The WRP 116 "chops" user data Ut into small piece data unit with chopping factor m. Taking the earlier data unit nomenclature of L size data units U1, U2, . . . Ut, the chopped write data is termed {U11, U12, ... U1m, U21, U22, ... U2m, ... Un1, Un2, ... Unm}. Thus, traditional L size data unit U1 comprises L/m size sequential data units U11, U12, . . . U1m. Similarly, U2 comprises sequential data units U21, U22, . . . U2m, and Un comprises Un1, Un2, . . . Unm.

Figure 3A:
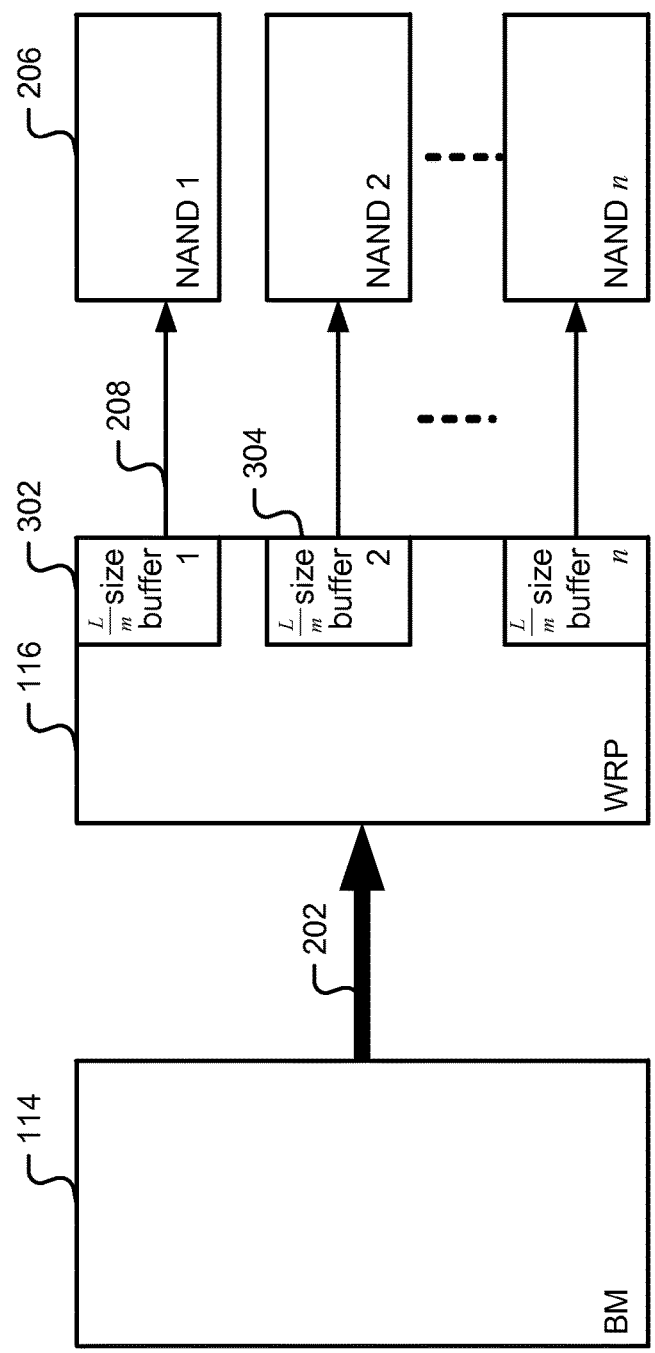
FIG. 3A is a block diagram illustrating an embodiment of efficient write-path flow.

FIG. 3A is a block diagram illustrating an embodiment of efficient write-path flow. Common to the traditional flow shown in FIG. 2A, the BM 114 is coupled via high throughput bus 202 to WRP 116, which is coupled via low throughput buses 208 to NAND blocks 206. In one embodiment, WRP 116 has n reduced size buffers (302, 304) of L/m size, a reduction of m times the area and power consumption.

Comparing the traditional write-path flow as shown for example in FIG. 2A with the efficient write-path flow as shown for example in FIG. 3A, the chopped data allows for reduced chip area for controller 106 and more optimized static power consumption with low impact to other aspects of system design. In one embodiment the only design changes is that firmware for CPU 112 is updated for m times as much data arbitration. Because the WRP 116 accesses multiple NAND devices 206 in parallel, the firmware can direct the WRP 116 to equally distribute the data workload across the NAND devices 206. One aspect of the improved design is to use the shortened buffer to support smoothly data transfer without "bubbles" between transferred periods.

The term "bubbles" refers to a condition of starving one or more busses/channels 208 to a NAND block, a reduction of efficiency.

Figure 3B:
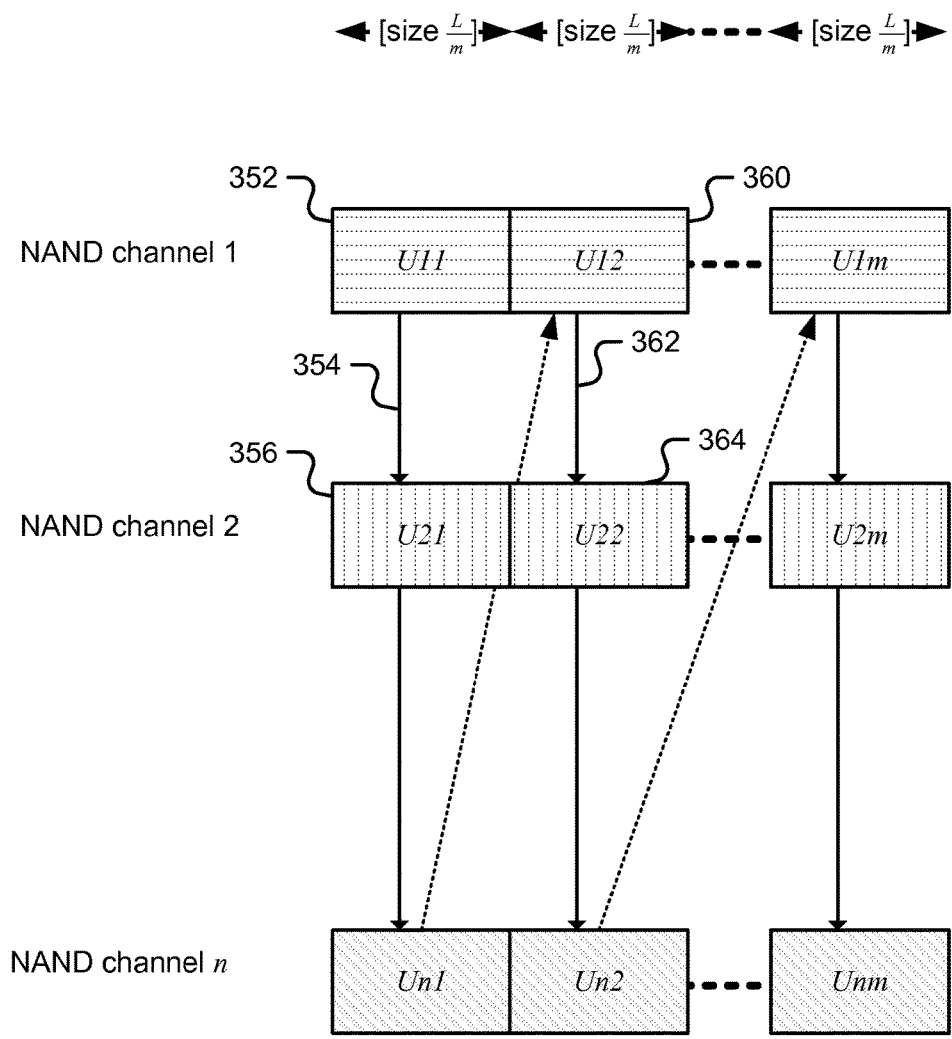
FIG. 3B is a block diagram illustrating data arbitration for a traditional write-path flow.

FIG. 3B is a block diagram illustrating data arbitration for a traditional write-path flow. This data transfer diagram shows the perspective of WRP 116 as it stores each chopped write data into a NAND channel buffer 208. In one embodiment, to reduce bubbles chopped write data U11 (352) is first stored in L/m size buffer 1, and at the end of that storage 354, chopped write data U21 (356) is then stored in L/m size buffer 2. That is, instead of the 'left-to-right' sequence shown in FIG. 2B that transfers each data unit at a time, with chopped write data, the arbitration is 'up-to-down', such that each smaller chopped write data is filling the reduced-size buffers in parallel. After chopped write data Un1 is stored in buffer n, then it continues with the next addressed/subaddressed piece of chopped write data for U1, which is U12 (360) and stored in buffer 1. At the end of that storage 362, chopped write data U22 (364), the next addressed piece of chopped write data for U2, is stored in buffer 2 and so forth. After Unm is transferred, then the process is repeated back to the next data unit, for example Up, that is chopped and started again with channel 1. Throughout this specification, the term "addressed prior to" indicates adjacent chopped write data, for example U11 is addressed prior to U12.

Thus, in one embodiment the efficient buffer allocation system puts U11 to buffer 1 first, then puts U21 to buffer 2, and so on. Because NAND throughput 208 is lower than BM throughput 202, system design and/or firmware ensures the WRP 116 can fetch U12 to refill buffer 1 before U11 "drains out", such that system performance can be nearly guaranteed without bubbles during the transfer.

Thus, for efficient design of the chopped system, chopped factor m is based at least in part on one or more of the following: the relationship between BM throughput 202 and NAND throughput 208, and the number of channels, n.

For a write path system design, there are three elements to finalize buffer allocation at the chip level: the first element is an analysis of the throughput relationship between BM 202 and NAND 208, and the number of NAND to be concurrently accessed, n; the second element is a decision on the chopping factor m, for WRP 116; and the third element is chopping the original data length L with chopping factor m and reduce the size of buffers to L/m.

In one embodiment, for the first element, the throughput relation plays an important role in buffer allocation. The larger difference between BM 202 and NAND 208, the more efficient buffer allocation may be implemented. Thus if BM 202 is X bytes per second, and NAND 208 is Y bytes per second, a starting chopping factor may be X/Y. Furthermore, this value may be tempered such that it is less than n, the number of data channels. In one embodiment then, $$m = \begin{cases} \frac{X}{Y}, & \frac{X}{Y} < n \\ n, & \text{otherwise} \end{cases} \quad (1)$$

For the second element, once the factor m is decided, the system would divide the original data unit size L to chopped write data size L/m. The WRP system efficiently distributes data from BM to multiple NAND channels as shown in FIG. 3B. For the third element, the buffer is set to a reduced size not only to reduce the area but also optimize the static power consumption, an important element of WRP 116.

Figure 4:
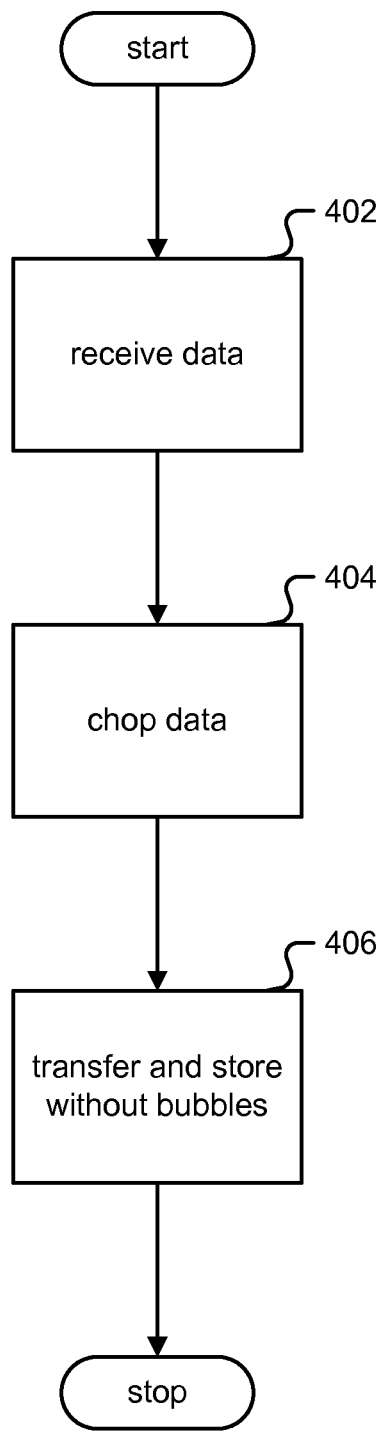
FIG. 4 is a flow chart illustrating an embodiment of a process for efficient buffer allocation for NAND write-path systems.

FIG. 4 is a flow chart illustrating an embodiment of a process for efficient buffer allocation for NAND write-path systems. The flow of FIG. 4 may be carried out by controller 106 in FIG. 1, including one or more of its components: controller 106, for example CPU 112, BM 114 and WRP 116.

In step 402, data is received. For the purposes of illustration, a first write data unit termed U1 and a second write data unit termed U2 are both received. U1 is destined for a first solid state storage channel, for example NAND 1. U2 is destined for a second solid state storage channel, for example NAND 2.

In step 402, data is chopped. As described above, U1 is chopped using chopping factor m in order to obtain (1) a first piece of chopped write data termed U11 destined for the first solid state storage channel and (2) a second piece of chopped write data termed U12 destined for the first solid state storage channel, wherein the first piece of chopping write data U11 is addressed prior to the second piece of chopped write data U12.

Similarly U2 is chopped using chopping factor m in order to obtain (1) a third piece of chopped write data termed U21 destined for the second solid state storage channel and (2) a fourth piece of chopped write data termed U22 destined for the second solid state storage channel, wherein the third piece of chopped write data U21 is addressed prior to the fourth piece of chopped write data U22.

The terms "second", "third", and "fourth" are used for ease of reference: Without loss of generality, there may be one or more pieces of chopped data addressed between the "second" piece of chopped write data U12 and "third" piece of chopped write data U21, for example U13, U14, etc.

In step 406, chopped data is transferred and stored.

Figure 5:
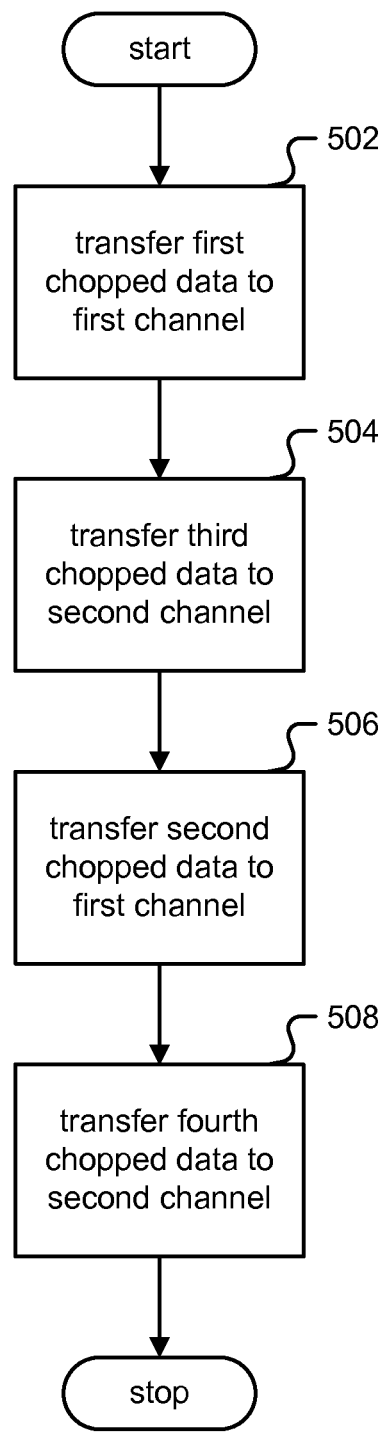
FIG. 5 is a flow chart illustrating an embodiment of a process for chopped data transfer and storage.

FIG. 5 is a flow chart illustrating an embodiment of a process for chopped data transfer and storage. The flow of FIG. 5 may detail step 406 in FIG. 4.

In step 502, the first piece of chopped write data U11 is transferred to WRP 116 and stored in a first channel buffer in the WRP, for example buffer 1 (302) in FIG. 3A. Note the first channel buffer (302) is a same size as the first piece of chopped write data U11, L/m.

In step 504, after transferring the first piece of chopped write data U11, the third piece of chopped write data U21 is transferred to the WRP 116 and stored in a second channel buffer (304) in the WRP 116. Note again the second channel buffer 304 is a same size as the third piece of chopped write data U21, L/m.

In step 506, after transferring U21, as shown in FIG. 3B without loss of generality at some point the second piece of chopped write data U12 will be transferred to the WRP 116 and stored in the first channel buffer (302) in the WRP.

In step 508, after transferring the second piece of chopped write data U12, the fourth piece of chopped write data U22 is transferred to the WRP 116 and stored in the second channel buffer (304).

In one embodiment, the first solid state storage channel 208 is a NAND channel in the non-volatile memory. In one embodiment, the first write data U1 is equal to a NAND page size L for NAND channels. In one embodiment, the WRP is coupled to n NAND channels, as shown in FIGS. 1 and 3A. In one embodiment, the chopping factor m is based at least in part on n as shown in Equation (1). In one embodiment, the chopping factor m is less than n. In one embodiment, the first write data is received at a throughput X. In one embodiment, the first write data is received at a throughput X (202) from BM 114. In one embodiment, the first piece of chopped write data is written at a throughput Y (208) to a NAND channel 206. In one embodiment, chopping factor is based at least in part on X and based at least in part on Y, for example dividing X by Y.

In one embodiment, a reduced size of the first piece of chopped write data is based at least in part on the NAND page size L for NAND channels divided by the chopping factor m. In one embodiment, each channel buffer is of the reduced size. In one embodiment, a designed WRP based on channel buffers of the reduced size has lower area than an old WRP based on channel buffers of the NAND page size. In one embodiment, a designed WRP based on channel buffers of the reduced size has lower static power consumption than an old WRP based on channel buffers of the NAND page size.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a non-volatile memory comprising a group of solid state storage cells;
a memory controller coupled with the non-volatile memory, wherein the memory controller is configured to:
receive a first write data destined for a first solid state storage channel and a second write data destined for a second solid state storage channel, wherein the first solid state storage channel is different than the second solid state storage channel;
chop the first write data using at least a chopping factor in order to obtain (1) a first piece of chopped write data destined for the first solid state storage channel and (2) a second piece of chopped write data destined for the first solid state storage channel, wherein the first piece of chopping write data is addressed prior to the second piece of chopped write data;
chop the second write data using at least the chopping factor in order to obtain (1) a third piece of chopped write data destined for the second solid state storage channel and (2) a fourth piece of chopped write data destined for the second solid state storage channel, wherein the third piece of chopped write data is addressed prior to the fourth piece of chopped write data;
transfer the first piece of chopped write data to a write-path system ("WRP");
store, in a first channel buffer in the WRP, the first piece of chopped write data, wherein the first channel buffer is a same size as the first piece of chopped write data;
after transferring the first piece of chopped write data, transfer the third piece of chopped write data to the WRP;
store, in a second channel buffer in the WRP, the third piece of chopped write data, wherein the second channel buffer is a same size as the third piece of chopped write data;
after transferring the third piece of chopped write data, transfer the second piece of chopped write data to the WRP;
store, in the first channel buffer in the WRP, the second piece of chopped write data;
after transferring the second piece of chopped write data, transfer the fourth piece of chopped write data to the WRP; and store, in the second channel buffer in the WRP, the fourth piece of chopped write data.

2. The system as recited in claim 1, wherein the first solid state storage channel is a NAND channel in the non-volatile memory.

3. The system as recited in claim 2, wherein the first write data is equal to a NAND page size for NAND channels.

4. The system as recited in claim 3, wherein the WRP is coupled to n NAND channels.

5. The system as recited in claim 4, wherein the chopping factor is based at least in part on n.

6. The system as recited in claim 5, wherein the chopping factor is less than n.

7. The system as recited in claim 2, wherein the first write data is received at a throughput X from a buffer manager system ("BM").

8. The system as recited in claim 7, wherein the first piece of chopped write data is written at a throughput Y to a NAND channel.

9. The system as recited in claim 8, wherein the chopping factor is based at least in part on X and based at least in part on Y.

10. The system as recited in claim 9, wherein the chopping factor is based at least in part on dividing the throughput X associated with a BM by the throughput Y associated with a NAND channel.

11. The system as recited in claim 3, wherein a reduced size of the first piece of chopped write data is based at least in part on the NAND page size for NAND channels divided by the chopping factor.

12. The system as recited in claim 11, wherein each channel buffer is of the reduced size.

13. The system as recited in claim 12, further comprising a designed WRP based on channel buffers of the reduced size has lower area than a WRP based on channel buffers of the NAND page size.

14. The system as recited in claim 13, further comprising a designed WRP based on channel buffers of the reduced size has lower static power consumption than a WRP based on channel buffers of the NAND page size.

15. A method, comprising:
  receiving a first write data destined for a first solid state storage channel and a second write data destined for a second solid state storage channel, wherein the first solid state storage channel is different than the second solid state storage channel;
  chopping the first write data using at least a chopping factor in order to obtain (1) a first piece of chopped write data destined for the first solid state storage channel and (2) a second piece of chopped write data destined for the first solid state storage channel, wherein the first piece of chopping write data is addressed prior to the second piece of chopped write data;
  chopping the second write data using at least the chopping factor in order to obtain (1) a third piece of chopped write data destined for the second solid state storage channel and (2) a fourth piece of chopped write data destined for the second solid state storage channel, wherein the third piece of chopped write data is addressed prior to the fourth piece of chopped write data;
  transferring the first piece of chopped write data to a write-path system ("WRP");
  storing, in a first channel buffer in the WRP, the first piece of chopped write data, wherein the first channel buffer is a same size as the first piece of chopped write data;
  after transferring the first piece of chopped write data, transferring the third piece of chopped write data to the WRP;
  storing, in a second channel buffer in the WRP, the third piece of chopped write data, wherein the second channel buffer is a same size as the third piece of chopped write data;
  after transferring the third piece of chopped write data, transferring the second piece of chopped write data to the WRP;
  storing, in the first channel buffer in the WRP, the second piece of chopped write data;
  after transferring the second piece of chopped write data, transferring the fourth piece of chopped write data to the WRP; and
  storing, in the second channel buffer in the WRP, the fourth piece of chopped write data.

16. The method as recited in claim 15, wherein the first solid state storage channel is a NAND channel in a non-volatile memory.

17. The method as recited in claim 16, wherein the chopping factor is based at least in part on dividing X throughput associated with a BM by Y throughput associated with a NAND channel.

18. The method as recited in claim 17, wherein a reduced size of the first piece of chopped write data is based at least in part on a NAND page size for NAND channels divided by the chopping factor.

* * * * *